No. 641,946. Patented Jan. 23, 1900.
W. H. McFARLAND.
PROTECTIVE TENT FOR TREES.
(Application filed July 26, 1899.)
(No Model.) 2 Sheets—Sheet 1.
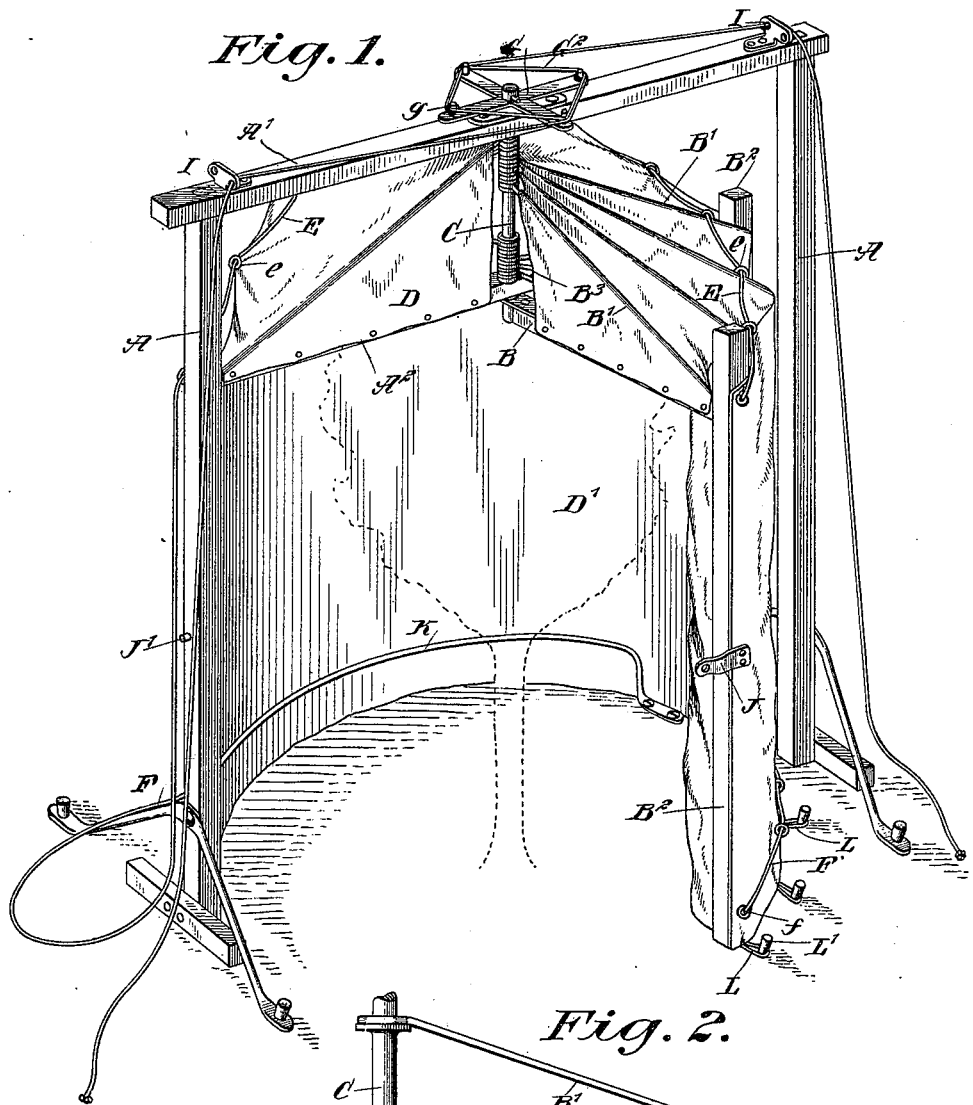
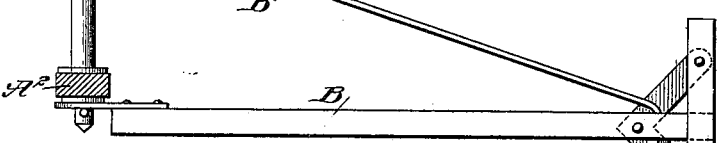
WITNESSES:
INVENTOR
W. H. McFarland
BY
ATTORNEYS No. 641,946. Patented Jan. 23, 1900.
W. H. McFARLAND.
PROTECTIVE TENT FOR TREES.
(Application filed July 26, 1899.)
(No Model.) 2 Sheets—Sheet 2.

WITNESSES:
C. W. Smith
H. L. Reynolds

INVENTOR
W. H. McFarland
BY
Munn & Co.
ATTORNEYS

THE NORRIS PETERS CO., PHOTO-LITHO., WASHINGTON, D. C.

UNITED STATES PATENT OFFICE.

WILLIAM HENRY McFARLAND, OF TITUSVILLE, FLORIDA.

PROTECTIVE TENT FOR TREES.

SPECIFICATION forming part of Letters Patent No. 641,946, dated January 23, 1900.

Application filed July 26, 1899. Serial No. 725,177. (No model.)

*To all whom it may concern:*

Be it known that I, WILLIAM HENRY MC-FARLAND, of Titusville, in the county of Brevard and State of Florida, have invented a new and Improved Protective Tent for Trees, of which the following is a full, clear, and exact description.

My invention relates to improvements in tents or similar devices designed for temporary application about fruit-trees and other tender plants to protect them from frost.

My invention comprises the novel features hereinafter described and claimed.

Reference is to be had to the accompanying drawings, forming a part of this specification, in which similar characters of reference indicate corresponding parts in all the figures.

Figure 4:
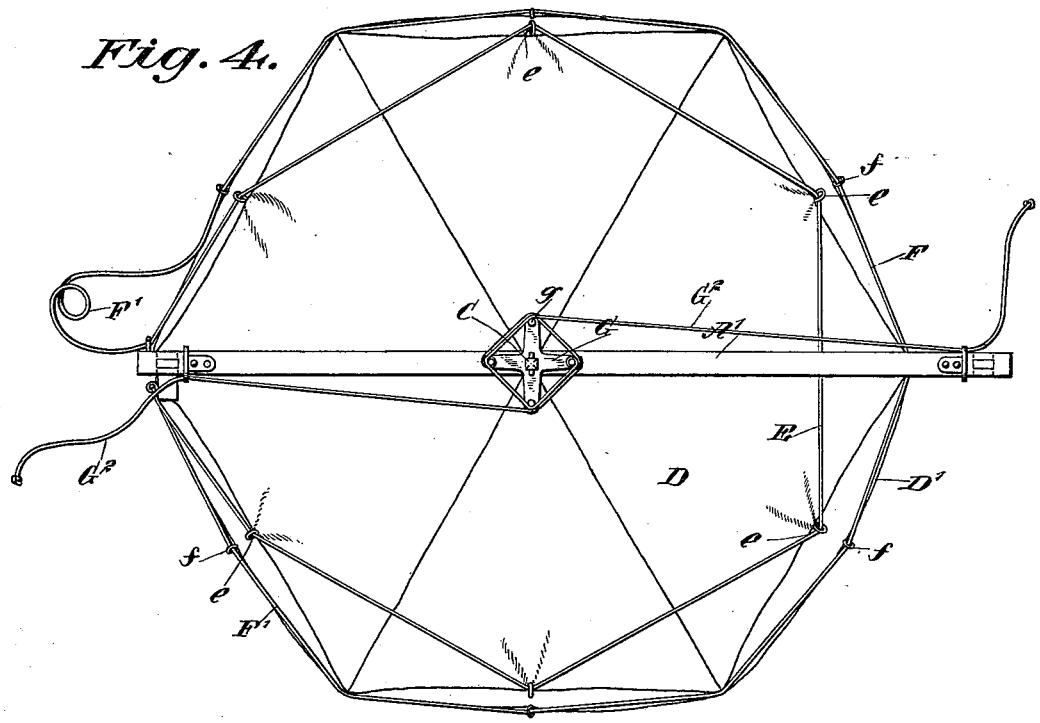
Figure 5:
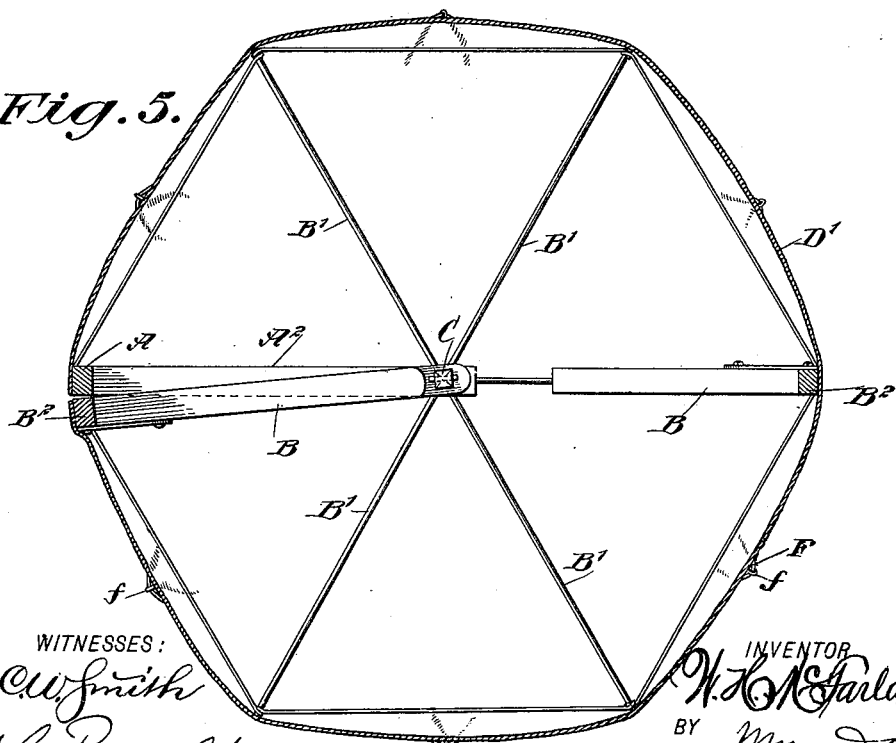

Figure 1 is a perspective view of my device shown partly open. Fig. 2 is a side elevation of one of the radial arms which is mounted to swing upon a central pivot. Fig. 3 is a top plan view of one of the radial arms, the same being, however, constructed slightly different from the one shown in Fig. 2. Fig. 4 is a top plan view of my device shown in the position occupied when inclosing a tree; and Fig. 5 is a sectional plan view of the same, taken just above the radial arms.

In Florida and in many other parts of the country it often happens that frosts kill orange-trees and other plants of tender growth, thus largely injuring the growers.

The object of my invention is to provide a device which can be used to inclose these trees when frost is probable, and thus to inclose sufficient heated air to prevent the lowering of the temperature to the danger-point. Except when a frost is probable my device is to be removed from about the tree, so that the tree has the full benefit of the sun and free circulation of air.

My device is supported upon any suitable framework, which is arranged alongside of or about the tree. This framework, as herein shown, consists of two posts A, which are placed upon opposite sides of the tree and are connected at the top by means of a cross-beam A', said beam being of sufficient height to be well above the top of the tree. These posts A may be driven into the ground or supported in vertical position by any other suitable means.

On the cross-beam A', at a point sufficiently above the tree, is supported a vertical pivot bar or shaft C, the upper end of said shaft being journaled in the cross-beam A' and the lower end journaled in a short bar A², which extends inward from one of the posts A, but which does not extend across to the other post. Upon the vertical pivot bar or shaft C are journaled a series of radial arms, and these radial arms are mainly composed of round rods B' and B³, which are journaled, respectively, upon the upper and lower portions of the shaft C, said rods being provided with eyes at their inner ends, as is clearly shown in Fig. 3, which surround the shaft. One, at least, of these radial arms is constructed somewhat differently from that described, said construction being shown in Fig. 2. In this construction the lower member of the arm B is of larger size, being usually a bar of wood which is similarly pivoted upon the lower end of the shaft C and at its outer end is connected with a vertical post or bar B², which extends downward to near the ground. I have herein shown two such posts, one adapted to occupy a position in line with the standards A when the device is placed about a tree and the other occupying a position alongside of the opposite post A.

Over the radial arms which are pivoted upon the shaft C is placed a cover D, and suspended from the outer ends of these arms is a cover D', which will drop to the ground. This cover is preferably formed of cloth which has been treated with some material to protect it from the weather and to render it as nearly as possible air and water tight. One end of this cover is secured to one of the posts or standards A, the other end being simply secured to the post B² and the last radial arm of the series. By reason of the construction described it is evident that the radial arms may be swung upon the pivot so as to bring them all alongside of each other, the flexible cover being bunched or folded alongside of the standard A, or by swinging them in the opposite direction the cover may be made to inclose a tree.

The post B², which is secured to the swinging or free end of the cover, is provided with a latch of any suitable form by which it may be secured to the post A when the device has been put in place about a tree. The form of latch herein shown consists of a plate or bar J, which is provided with a hole adapted to pass over a pin J', secured to the post A. This folding and opening of the device may be done by hand engagement with the post B² and the cover or may be accomplished by other mechanism operated by a cord. I have herein shown such a mechanism, the same consisting of a reel which is secured to the upper end of the pivot-shaft C and which has a cord passing over the same and conducted through suitable guides. This reel, as herein shown, consists of two cross-bars G, which are provided with upwardly-extending pins g at their outer ends. In lieu of the reel a grooved wheel may be substituted. About this reel or wheel, if such is used, a cord G² is passed, one end thereof being secured to the reel and the other end being conducted through guides I and downward to where it may be conveniently engaged. Two such cords may be provided, if desired, the same being conducted downward alongside of the two standards or posts A. By pulling at one of these cords the shaft C will be turned and the end arm B of the series, being secured to the shaft, will be swung upon the shaft as a center, carrying with it the cover and the other arms.

A means by which the device may be closed or folded in a similar manner is also provided, the same consisting of a cord E, which is secured to the end post B² and passes through suitable guides e, secured to the cover or to the swinging arms. As herein shown, this cord is doubled, one end passing about the upper end of the cover and the other end F of the cord passing about the lower end of the cover and through eyes f. By engaging the central loop F', which connects these two sections of the same cord, and pulling upon the same, the cover may be evenly swung together. By this means the frictional engagement of the lower portion of the cover with the ground may be overcome by the lower cord F, which is secured to the lower part of the cover.

It is designed that my device shall be placed alongside of the tree before the cold weather is liable to occur. While the weather is warm the cover will be folded alongside of one of the standards A, thus permitting free access of light and air to the tree and also permitting cultivation about the tree. As soon as warning of frost has been obtained the covers are unfolded and extended about the tree, being secured in place so as to imprison a body of warm air, and thus protect the tree. In order to make the protection more sure, the lower edge of the cover is secured to the ground by means of the loops L, which are provided at frequent intervals and through each of which a stake L' is driven.

That side of the device which faces toward the prevailing winter storms is provided with securing means of another form, consisting of the circularly-curved rod or bar K, which is bent to correspond to the circle of the cover when closed and has its ends supported from the ground by being bent downward and driven therein or by being secured to posts. This rod lies, preferably, inside the tent, and the proper section of the canvas is held thereby by suitable means.

If the temperature should fall sufficiently to warrant it, a small fire may be started within the cover or a small portable stove or lamp be placed within the same. By this means it will be possible to prevent trees from being killed by any temperature which is ordinarily liable to occur in orange-growing districts, and a great deal of fruit which would otherwise be killed by frost may be saved.

Having thus fully described my invention, I claim as new and desire to secure by Letters Patent—

1. A protective tent for fruit-trees, comprising a support having a pivot-bar centrally located above the tree, a series of arms mounted to swing thereon, and a flexible covering over said bars and depending from the ends thereof and adapted to inclose the tree when the arms are properly spaced, substantially as described.

2. A protective tent for fruit-trees, comprising a support having a pivot-bar centrally located above the tree, a series of arms mounted to swing thereon, a flexible covering over said bars and depending from the ends thereof adapted to inclose the tree, and a cord extending about the periphery of the tent and through suitable guides thereon and secured at one end to one end of the tent-cover, whereby pulling upon the cord will swing the arms in the same direction to open the device, substantially as described.

3. A protective tent for fruit-trees, comprising a support extending above the tree, a vertical pivot journaled therein centrally of the tree, a series of arms mounted to turn on said pivot, one end arm of the series being fixedly secured to the pivot, a reel secured to said pivot, a flexible covering over said arms and depending therefrom to inclose the tree, and a cord passing about the said reel, whereby the arms may be swung upon their pivot to inclose the tree, substantially as described.

4. A protective tent for fruit-trees, comprising a support extending above the tree, a vertical pivot journaled therein centrally of the tree, a series of arms mounted to turn on said pivot, one end arm of the series being fixedly secured to the pivot, a reel secured to said pivot, a flexible covering over said arms and depending therefrom to inclose the tree, a cord passing about the said reel, whereby the arms may be swung upon their pivot to inclose the tree, and a cord passing in the opposite direction about the device and through suitable guides, whereby the arms may be swung to open the device and fold it together, substantially as described.

5. A protective tent or covering device for fruit-trees, comprising a fixed support extending over the top of the tree and having a vertical pivot-shaft placed centrally over the tree, a series of arms journaled on said shaft, one end arm of the series being secured to turn with the shaft, a bar or post depending from the end of said arm, a flexible cover for the framework formed by said arms and bar, one end of the cover being fixed to the fixed support, whereby the tree may be quickly inclosed or uncovered, substantially as described.

6. A protective tent or covering device for fruit-trees, comprising a fixed support extending over the top of the tree and having a vertical pivot-shaft centrally placed over the tree, a series of arms journaled on said shaft, one end arm of the series being secured to turn with the shaft, a bar or post depending from the end of said arm, a flexible cover for the framework formed by said arms and bar, one end of the cover being fixed to the fixed support, a cord passing about the frame, through suitable guides and secured to the swinging ends of the cover, whereby the cover may be quickly folded, a reel secured to the central pivot-shaft and a cord passing about said reel in the opposite direction to the other cord, whereby the cover may be quickly extended about the tree, substantially as described.

7. A circular protective tent for trees, provided with a slit extending up one side thereof to the center of the top, a fixed support or pivot above the tree at the center of the top of the tent, and means swinging horizontally on said pivot or support for supporting the tent to move circularly to open or close the same.

8. A protective tent for trees, provided with a slit extending up one side to the center of the top, a fixed central support or pivot above the tree, means for swinging the tent about said support to open or close the tent, and a fixed curved support for holding the bottom of the tent, substantially as described.

9. A protective tent for fruit-trees, comprising a support having a pivot-bar centrally located above the tree, a series of arms mounted to swing thereon, and a flexible covering or tent upon said arms and depending from the ends thereof and adapted to inclose the tree when the arms are properly spaced, and a fixed curved support extending within the tent at one side and adapted to engage and hold the bottom of the tent, substantially as described.

WILLIAM HENRY McFARLAND.

Witnesses:
GEORGE M. ROBBINS,
F. A. MORGAN.